Nov. 2, 1926.
E. A. SPERRY, JR
1,605,571
REPEATER MOTOR
Filed Dec. 3, 1920
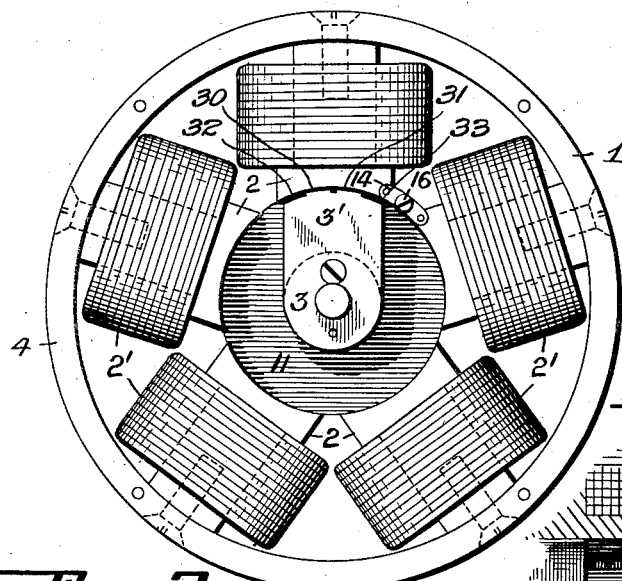
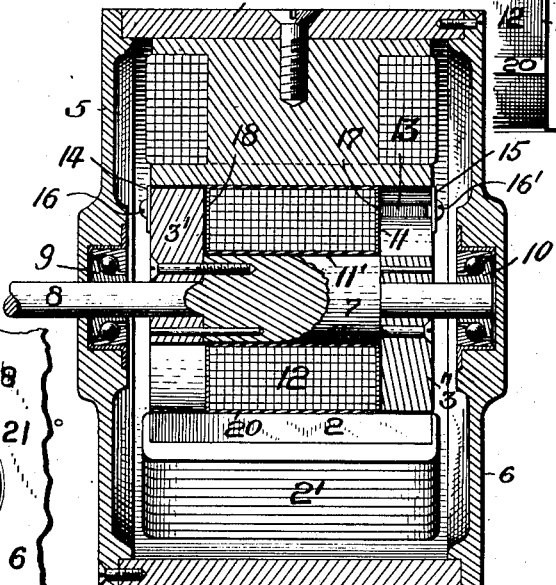
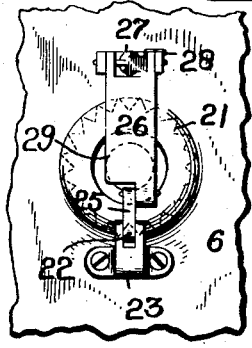
Inventor
ELMER A. SPERRY. JR.
By his Attorney
Herbert H. Thompson Patented Nov. 2, 1926.

1,605,571

UNITED STATES PATENT OFFICE.

ELMER A. SPERRY, JR., OF BROOKLYN, NEW YORK, ASSIGNOR TO THE SPERRY GYROSCOPE COMPANY, OF BROOKLYN, NEW YORK, A CORPORATION OF NEW YORK.

REPEATER MOTOR.

Application filed December 3, 1920. Serial No. 427,997.

This invention relates to repeater motors adapted to position an indicator or other device in accordance with the position of a remotely located element. More specifically the invention pertains to a repeater motor of the type having a polarized armature, such as shown, for example, in my application Serial No. 397,968, filed July 21, 1920, for "electrical transmission systems." It has heretofore been the practice to polarize the armature by providing a coil movable therewith, which necessitates the provision of slip rings and brushes for conducting current to the coil. The principal object of my invention is to provide polarizing means for the armature of a repeater motor so arranged that the objectionable slip rings and brushes may be eliminated.

Another object is the provision of an improved type of means for preventing loss of synchronism between the transmitter and repeater motor. In the type of repeater motor illustrated in my above mentioned application loss of synchronism with the transmitter occurs if the transmitter shaft is moved through 180 degrees while the current is off. To insure synchronism I have provided means including a member responsive to leakage of flux from the motor for imparting a slight rotation to the motor armature upon the breaking of a circuit through the motor.

Other objects and advantages will become apparent as the description of the invention is hereinafter developed.

Referring to the drawings wherein I have shown what I now consider to be the preferred form of my invention:

Fig. 1 is a plan view of my improved repeater motor, the top section of the motor casing being removed.

Fig. 2 is a vertical sectional view of the motor of Fig. 1.

Figs. 3 and 4 are detail views illustrating the improved means for preventing loss of synchronism.

The repeater motor 1 is shown as comprising a plurality of field poles 2 and a rotatable armature 3, housed within a suitable casing. The latter may consist of a cylindrical section 4 and a pair of end sections 5 and 6 secured together by screws or in any other suitable manner. The field poles 2 may be held in the motor casing in any suitable way, as by being secured to casing section 4. The armature 3 is shown as comprising a pair of elements 3' and 3'' suitably secured to opposite ends of a cylindrical enlargement 7 which may be formed integral with or otherwise secured to an intermediate portion of shaft 8. Said shaft is shown mounted in anti-friction bearings 9, 10, in end plates 5 and 6, respectively. The shaft 8, enlargement 7, and elements 3' and 3'' are of iron or other magnetic material. Suitable windings 2' are provided for the field poles. By way of example, I have shown five pole-pieces 2, as in the repeater motor in my patent application above referred to, although the number of pole-pieces is, of course, immaterial to my invention. With a repeater motor of the type shown in said application, having five pole pieces, it is possible to obtain twenty steps of the armature in one revolution thereof provided the armature is polarized. In order that the steps may be well defined, I prefer to provide means for localizing the magnetic flux passing between the armature and fields, as described in my aforesaid application. In this application, the means to this end consists in providing the armatures 3' and 3'' with the central portion or portions thereof, 30 and 31, of slightly greater radius than the end portions thereof, 32 and 33. In other words, the armature has reduced end portions 32 and 33. The central portions 30 and 31 may or may not be divided as desired. By this construction, sharper definition of the steps of the motor are obtained and the armature is prevented from sticking to the pole which it is leaving when advancing to the next pole. The width of the combined face 30, 31 is preferably about the width of one step of the motor, i. e., if the motor has 20 steps, the width of said face is about 18 degrees. In order to effectively polarize the armature and at the same time eliminate the slip rings and brushes which are necessary when a polarizing coil movable with the armature is utilized I have provided means constructed and arranged substantially as follows:

An annular housing 11, preferably of brass or other non-magnetic material, is interposed between enlargement 7 and the inner faces of pole pieces 2. A convenient form which said housing may assume is that of a spool having an inner cylindrical shell 11' and end plates 17, 18, the latter being connected at their outer peripheries by tie-strips 20, shown clearly in Fig. 3. As shown, the inner faces of the pole pieces are curved on the circumference of a circle and are adapted to receive the housing with a fairly snug fit. The housing 11 is of a length substantially equal to the distance between the inner surfaces of the armature elements 3', 3'', a slight clearance between the inner surface of each element and the end plates of said housing being provided to avoid friction during rotation of the armature. Likewise, a slight clearance, 1/64th of an inch for example, is provided between enlargement 7 and the inner circumference of the housing 11. Within said housing is a coil 12 for polarizing the elements 3', 3''. The latter are shown extending laterally from extension 7 in opposite directions, and since they are at opposite ends of housing 11 it is evident that when coil 12 is energized one of said armature elements will be a north pole and the other a south pole. In other words, the armature will be polarized. At the same time slip rings and brushes or other objectionable rubbing contacts for leading current to the polarizing coil are eliminated.

It is desirable to provide means for adjusting housing 11 axially with respect to pole pieces 2 and armature elements 3', 3''. To accomplish this I may provide said housing with a lug 13 soldered or otherwise secured to the outer circumference thereof and adapted to fit snugly between two adjacent pole pieces. Bridge pieces 14, 15 are shown at opposite ends of said pole pieces, through which bridge pieces pass screws 16, 16', respectively, which are received in the ends of lug 13. Said lug may extend beyond the ends of housing 11 to points adjacent the bridge pieces 14, 15, as shown, suitable space being provided for adjustment of said lug and the attached housing with respect to said bridge pieces. From this construction it will readily be seen that by properly adjusting screws 16, 16' the housing 11 can be moved axially in either direction with respect to the shaft 8 and the faces of pole pieces 2.

As fully explained in my prior application above referred to, movement of the transmitter shaft through 180 degrees while the current is off will result in loss of synchronism between the transmitter and repeater motor. To prevent this I disclosed in said application means including an electromagnet in circuit with the repeater for either imparting a slight rotation to the repeater armature upon the establishment of a circuit through the repeater motor or rotating said armature through one-half a transmitter step when the circuit through the motor is broken. In my improved means for preventing loss of synchronism I have replaced said electromagnet by a member responsive to leakage of flux from the motor. One form which said means may assume is shown in Figs. 3 and 4 as applied to the motor of Figs. 1 and 2, and may be constructed substantially as follows:

Connected for rotation with shaft 8, as by being secured to armature element 3'', is a toothed wheel 21. A bell-crank lever 22 is pivoted in a bracket 23 on the outside of end plate 6 and has one arm 24 extending through an opening in said end plate to a position adjacent wheel 21. The other arm 25 of the bell-crank lever is pivotally attached to one end of a member 26 of magnetic material, which member is pivoted at its other end to a bracket 27. A spring 28 coiled about the pivotal axis of arm 26, and having one end bearing against said member and the other against bracket 27, normally tends to maintain member 26 and lever 22 in the position shown in Fig. 3. When current flows through the repeater motor, however, sufficient magnetic flux leaks from the end of shaft 8 to attract member 26 and move arm 24 of bell-crank lever 22 out of engagement with the teeth of wheel 21. In Fig. 3 the end of shaft 8 is shown as extending beyond bearing 10'. If desired, a cap 29 of magnetic material may be fitted over the end of shaft 8 to decrease the air gap between said shaft and member 26, though the same result may be obtained without the aid of a cap if shaft 8 is made of a length sufficient to bring its end closer to member 26. With arm 24 held out of engagement with toothed wheel 21 it will be seen that when the circuit through the repeater motor is broken spring 28 will move member 26 and lever 22 to cause arm 24 to move wheel 21 and hence shaft 8. The teeth of wheel 21 are so positioned with respect to arm 24 that when current is flowing through the motor each step of the armature, corresponding of course to a transmitter step, results in bringing a tooth of wheel 21 opposite and adjacent to arm 24. Now, when the circuit through the motor is broken arm 24 is moved until it occupies a position between adjacent teeth of wheel 21, with the result that said wheel and shaft 8 are moved through one-half step of the repeater armature, which also corresponds to one-half step of the transmitter. Since the latter moves step-by-step it will readily be seen that movement of the transmitter through 180 degrees with respect to the repeater is now impossible and hence loss of synchronism is prevented. Upon reestablishment of current through the repeater motor, member 26 is again attracted and arm 24 withdrawn from engagement between the teeth of wheel 21. The repeater armature and shaft 8 are then moved, by the poles of the repeater motor then energized, into position corresponding with the transmitter.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. In a repeater motor having a plurality of field poles and a rotatable armature, a stationary polarizing coil supported by said poles, and means for adjusting the position of said coil with respect to said poles.

2. In a repeater motor having a plurality of field poles and a rotatable armature, a stationary polarizing coil fixed with respect to said poles and surrounded thereby, and means for adjusting the position of said coil with respect to said poles.

3. In combination with a repeater motor, a movable armature having a plurality of defined step positions and means for turning said armature through less than a step upon failure of the flow of current through said motor, said means being normally rendered inoperative by a leakage of flux from the motor.

4. In combination with a repeater motor, a rotatable armature, having a plurality of defined step positions, a movable member for turning said armature through a portion of a step, means responsive to leakage of flux from said motor for moving said member in one direction, and means for moving said member in the opposite direction upon withdrawal of said flux from said first named means.

5. In combination with a repeater motor having a plurality of field poles and a rotatable armature, stationary means for polarizing said armature including a member surrounded by said poles, a lug secured to said member and fitted between a pair of adjacent poles, bridge pieces extending across the space between said poles at opposite ends thereof, and screws passing through said bridge pieces and threaded into said lug.

6. In a repeater motor having a plurality of field poles and a rotatable armature, a stationary polarizing coil and means for moving said coil axially for adjusting the position of said coil with respect to said poles.

7. In combination with a repeater motor, a movable armature having a plurality of defined step positions, and means for turning said armature through less than a step upon failure of the flow of current through said motor, said means including a magnetic member responsive to leakage of flux from said motor.

8. In combination with a repeater motor, a movable member having a plurality of defined step positions, and means for turning said armature through less than a step upon failure of the flow of current through said motor, said means including a magnetic member responsive to leakage of flux from said motor for holding said means normally ineffective but adapted to permit said means to be rendered effective when the current through said motor fails.

9. In combination with a repeater motor, a rotatable armature having a plurality of defined step positions, a movable member for turning said armature through a portion of a step, means responsive to leakage of flux from said motor for moving said member to ineffective position and means for moving said member to effective position upon failure of flux through said motor.

In testimony whereof I have affixed my signature.

ELMER A. SPERRY, Jr.